(12) United States Patent
Vigoda et al.

(10) Patent No.: US 6,642,837 B1
(45) Date of Patent: Nov. 4, 2003

(54) METHOD AND APPARATUS FOR TOUCH-ACTIVATED IDENTIFICATION AND INFORMATION TRANSFER

(75) Inventors: Benjamin Vigoda, Cambridge, MA (US); Neil Gershenfeld, Somerville, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 09/420,829

(22) Filed: Oct. 19, 1999

(51) Int. Cl.$^7$ ............................ H04Q 5/22; H03K 17/94
(52) U.S. Cl. ............ 340/10.1; 340/10.51; 340/825.72; 340/562; 200/DIG. 2; 200/600; 341/33
(58) Field of Search ............................ 340/10.1, 10.51, 340/562, 5.9, 825.72, 5.92, 5.91; 341/20, 33; 200/600, DIG. 2; 235/385

(56) References Cited

U.S. PATENT DOCUMENTS

| | | | |
|---|---|---|---|
| 3,696,409 A | * 10/1972 | Braaten | 341/33 |
| 4,233,522 A | * 11/1980 | Grummer et al. | 341/33 |
| 4,237,421 A | * 12/1980 | Waldron | 340/562 |
| 4,550,221 A | * 10/1985 | Mabusth | 341/33 |
| 4,733,222 A | * 3/1988 | Evans | 200/DIG. 1 |
| 5,204,672 A | 4/1993 | Brooks | 340/825.71 |
| 5,270,710 A | * 12/1993 | Gaultier et al. | 341/33 |
| 5,682,032 A | 10/1997 | Philipp | 235/422 |
| 5,773,812 A | 6/1998 | Kreft | 235/492 |
| 6,211,799 B1 | * 4/2001 | Post et al. | 341/33 |

FOREIGN PATENT DOCUMENTS

| | | |
|---|---|---|
| EP | 0 702 316 A1 | 3/1996 |
| GB | 2129176 A | 10/1984 |

OTHER PUBLICATIONS

Zimmerman, "Personal Area Networks: Near-field intra-body communication," *IBM Systems Journal*, 35: 1–9 (1996).

* cited by examiner

*Primary Examiner*—Donnie L. Crosland
(74) *Attorney, Agent, or Firm*—Testa, Hurwitz & Thibeault, LLP

(57) ABSTRACT

Physical structures respond to proximity or touch, conveying to a reader information such as the identity of the structure or some data associated therewith. In its simplest form, the structure comprises an electrical load and a pair of electrodes connected thereto. The electrodes are spaced apart (by air or other dielectric medium). A signal generator, which acts as a "reader," is connected to a larger electrode that may be embedded in an environmental surface. When the structure is placed in proximity to the reader electrode, application of the signal results in capacitive coupling between the reader and the electrodes of the structure. The structure is not detected by the reader, however, because the capacitive coupling is comparable for both electrodes, so the load experiences only a small electrical gradient. But if one of the electrodes is grounded, this symmetry is broken and current is drawn through the load. In general, grounding occurs when a person, coupled (even weakly) to environmental ground—e.g., by virtue of standing on the floor—touches one of the electrodes. The resulting loading, which may be varied over time by the structure, is detected by the signal generator.

21 Claims, 2 Drawing Sheets

METHOD AND APPARATUS FOR TOUCH-ACTIVATED IDENTIFICATION AND INFORMATION TRANSFER

FIELD OF THE INVENTION

The present invention relates to electronic communication, and in particular to the propagation of electrical signals by means of a user's body through electrostatic coupling through a person.

BACKGROUND OF THE INVENTION

Traditional forms of short-range electronic communication typically involve radiated energy. For example, radio-frequency identification (RFID) devices have been employed for some time to remotely sense parameters of interest in people or objects. An RFID device receives a wireless signal from an externally located "reader," which determines the parameter of interest based on the response of the RFID device to the transmitted signal. A simple application of this technology is security: an individual wears an RFID "tag" or badge, and a controlled-entry system unlocks a door only if the wearer's tag is recognized as s/he approaches.

Magnetostatic RFID systems respond to magnetic fields and therefore require induction coils, which add weight and cost to the device in addition to establishing a minimum size. As explained in copending application Ser. No. 08/965,465, filed on Nov. 6, 1997, electrostatic devices offer practical advantages over magnetostatic systems since the induction coil is eliminated and electrodes can be conveniently and inexpensively deposited on substrates of widely varying shapes and materials. The ease of focusing an electric field as compared with a magnetic field also favors electrostatic systems.

In accordance with the approach disclosed in the '465 application, a transmitter and receiver are capacitively coupled through a user and room ground. In particular, a transmitter produces low-frequency (generally 100 kHz to 10 MHz) AC signals that pass, through capacitive coupling, as displacement currents into and from the body of the user, carrying both power and data to a receiver, which is also coupled to the user's body. Since the transmitter and receiver do not couple with one another directly, the shared room ground provides the return path for the current.

An important aspect of operation is the asymmetric arrangement of electrodes with respect to the user. An inner electrode of the receiver or transmitter is closely coupled capacitively to the user's body such that the "quasi-electrostatic" field resulting from the electrode potential causes a displacement current to pass to user's body. The outer electrode is oriented so that its coupling to the room ground is stronger than that of the inner electrode. This enforced asymmetric coupling ensures that a potential difference exists across the electrodes, thereby completing the circuit.

While highly useful in many applications, the approach of the '465 application does not offer selectivity of communication: whenever a receiver is coupled to a transmitter by mutual contact with the user, they will necessarily intercommunicate. This approach, therefore, does not lend itself well to facilitating selection of one transmitter from among a plurality.

DESCRIPTION OF THE INVENTION

Brief Summary of the Invention

The present invention utilizes intrabody transmission of displacement current and RFID technology to provide physical structures that are responsive to touch; in particular, touching a selected structure conveys information, e.g., the identity of the structure and/or some associated data. In its simplest form, the structure comprises an electrical load and a pair of electrodes connected thereto. The electrodes are spaced apart (by air or other dielectric medium). A signal generator, which acts as a "reader," is connected to a larger electrode that may be embedded in an environmental surface. When the structure is placed in proximity to the reader electrode, application of the signal results in capacitive coupling between the reader and the electrodes of the structure. The structure is not detected by the reader, however, because the capacitive coupling is comparable for both electrodes, so the load is subjected only to a small electrical gradient. But if one of the electrodes is grounded, this symmetry is broken and current is drawn through the load. In general, grounding occurs when a person, coupled (even weakly) to environmental ground—e.g., by virtue of standing on the floor—touches one of the electrodes. The resulting loading is detected by the signal generator, confirming, for example, that the structure had been touched (or nearly touched). In some embodiments, the system may contain numerous such structures in proximity to the reader electrode, each structure having a different load; by virtue of the loading it experiences, the reader can determine which structure has been selected.

In more elaborate embodiments, the load is an RFID chip capable of imparting information to the signal generator in the form of loading variations. In the time domain, the temporal pattern of these variations can encode a sequence of bits.

Numerous applications are possible depending on where the structure and the reader are located. The structure may, for example, be embedded in a portable object, such as a package, or in the token of a game. Touching a particular object may connote selection of that item by the user, who may thereupon receive information about the item or advance the play of the game. The reader may be associated with a game board (the electrode disposed, for example, within or underneath the board), as part of an item of furniture (e.g., disposed below a table, desktop, or shelf, or behind a whiteboard), or within an architectural surface or fixture. The structure may also act as an interface, contact with the structure causing action to be taken by an associated computer. For example, the structure may specify the address of a web page; in this way, the user may select from among numerous web pages by touching a physical object associated therewith.

In accordance with the invention, wireless communication of information is accomplished using a tag unit comprising an electrical load and a pair of parallel, spaced-apart electrodes. A signal source is capacitively coupled to the electrodes without creating a significant potential difference therebetween. The signal source is configured to detect the load and derive information therefrom when current is drawn therethrough as a result of selective coupling of one of the electrodes to ground, thereby creating a potential difference across the electrodes. This approach is distinct from intrabody and interbody electrostatic communication systems such as that disclosed in the '465 application in that coupling is inherently symmetric rather than asymmetric, so that a circuit activating the load is not ordinarily completed; it requires the intervention of a user to actively break the symmetry in order to trigger a response.

BRIEF DESCRIPTION OF THE DRAWINGS

The foregoing discussion will be understood more readily from the following detailed description of the invention, when taken in conjunction with the accompanying drawings, in which.

DETAILED DESCRIPTION OF THE PREFERRED EMBODIMENTS

Figure 1:
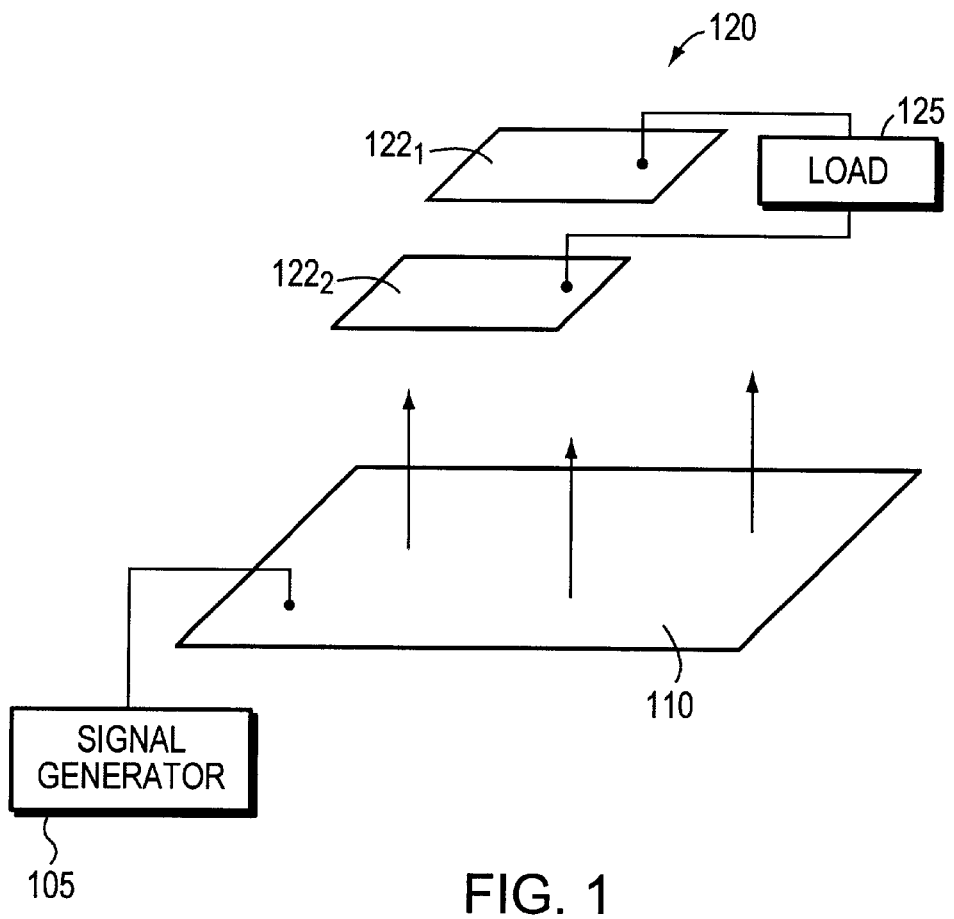
FIG. 1 schematically represents a system in accordance with the present invention.

With reference to FIG. 1, a signal source 105 applies a time-varying electrical signal to a large transmitting electrode 110, creating an electric field as indicated by the arrows. A receiver 120 includes, in the simplest embodiment, a pair of electrodes $122_1$, $122_2$ arranged one above the other, in proximity to transmitting electrode 110 and separated by a dielectric medium (air, plastic, rubber, etc.). An electrical load 125 is connected across the electrodes. For example, with signal source 105 transmitting at a fixed frequency, load 125 may be an LRC circuit. The closer the resonant frequency of the LRC circuit is to the frequency of the AC signal, the greater will be the loading on source 105.

So long as electrodes $122_1$, $122_2$ are spaced closely relative to their overall spacing from electrode 110, the electric field capacitive coupled to both electrodes will be comparable, creating only an insignificant potential difference across the electrodes and, hence, load 125. As used herein, a "significant" potential is one that results in detection of the receiver by the reader. For example, a typical receiver circuit will require about 10 mW to operate; anything less than the potential necessary to achieve this threshold power requirement is "insignificant" in that the receiver will not be detectable by the reader.

The maximum spacing between electrode 110 and electrodes $122_1$, $122_2$ is determined by the sizes of the various electrodes and the voltage applied by signal generator 105. For similarly sized electrodes, it is found that a reasonable benchmark for this maximum distance is between the electrode radius and diameter; that is, 5-in receiver electrodes are best located no more than 2.5 to 5 in away from the reader electrode.

The proximity between the user's hand or finger and one of the receiver electrodes necessary to produce a detectable response follows a similar pattern. In particular, if the sizes of the electrodes are on the order of a hand, then it is found that the user's hand must generally approach the receiver electrode within a distance on the order of the hand size in order to produce a response.

When a user touches, for example, upper electrode $122_1$, the signal coupled into that electrode passes through the user's body to ground via capacitive electrostatic linkage. The capacitances linking the user to ground can be a combination of air and earth ground, and materials in the vicinity of the user (such as plumbing, metal cabinets, reinforcement studs, etc.) Generally, such capacitances are on the order of 10–100 pF. The capacitances necessary for coupling reach adequate levels only when the user physically touches, or nearly touches, the electrode. Generally, the voltage $V_t$ from signal source 105 is given as $V_t = V_0 e^{j\omega_t t}$ where $\omega_t = 2\pi f$, and $V_0 \approx 50$–$1000$ V. At 50 V, for example, approximately 1.5 milliwatt of power is available to the receiver, depending on the efficiency of coupling.

As noted above, electrode 110 may be part of a game board or an item of furniture, or disposed within an architectural surface or fixture. Receiver 120 may be associated with items normally found on the surface containing electrode 110; for example, numerous packages on an electrode-equipped shipping table may each contain a receiver 120 with a unique load. Signal source 105 is configured to sense the amount of loading it experiences; by consulting a database relating items to the loads of the receivers associated with those items—which database may be stored in an on-board memory circuit or in a computer with which source 105 communicates—source 105 is able to identify an item when it is touched. In other words, a touched item identifies itself to a signal source applying a time-varying voltage by means of the presented impedance and, hence, the output current of the signal source. In effect, the receiver "transmits" a single bit to signal source 105.

Figure 2:
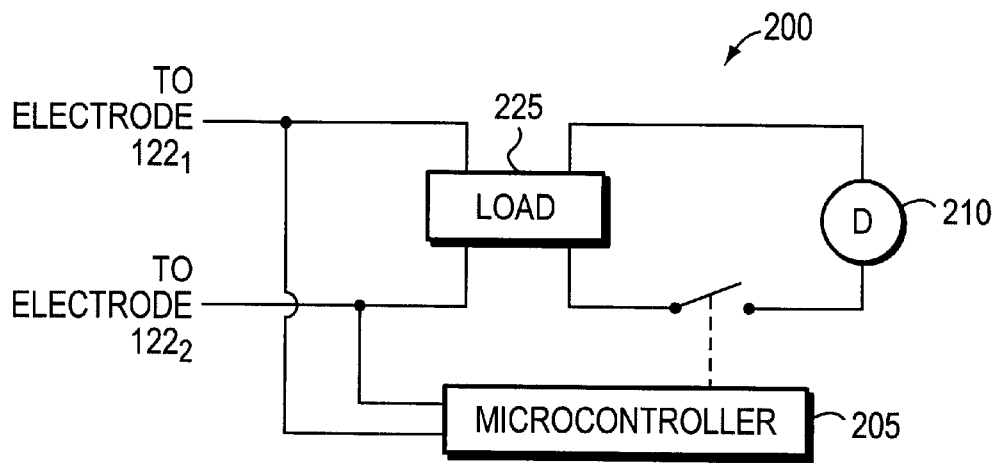
FIG. 2 schematically represents a more elaborate embodiment capable of conveying multiple bits of information.

In a more elaborate embodiment, the receiver effectively sends multiple bits of information to the signal source by modulating the Thevenin equivalent load to which the signal source is coupled. The receiver to be able to change, over time, its electrical characteristics in a manner detectable by the transmitter. By selectably altering its response to received electrical energy, the receiver can effectively convey ("transmit") information as a series of bits in the time domain. A receiver circuit 200 configured for operation in this manner is shown in FIG. 2, and includes a microcontroller 205 that switchably connects an additional component or device 210 to the load 225. The result of connecting device 210 is a change in the impedance of the receiver 200, which is sensed by the signal source as a change in loading. Microcontroller 205 is powered parasitically by the AC signal.

Repeated changes in loading in accordance with a pattern representing information is, in effect, amplitude modulation. If desired (e.g., for better noise immunity), the AM carrier can itself contain a subcarrier encoding another modulated signal. For example, the AM carrier can be demodulated into a square wave of varying pulse widths, the variations representing an FM encoding of data. The temporal pattern according to which device 210 is switched into and out of the circuit 200 is stored in a memory associated with microcontroller 205.

If device 210 is a parasitic resistor or a pair of clamping diodes, connection of device 210 alters the Q of the receiver circuit 200; if device 210 is a capacitor or inductor, the resonant frequency is altered. Changing the Q of the receiver is herein referred to as "Q-switching," while changing the resonant frequency is called "frequency shift keying" (FSK).

In an exemplary embodiment, the receiver 200 comprises a discrete 9.5 mH inductor, an RFID chip (e.g., the V4050 chip supplied by EM Microelectronic-Marin SA, although the choice of RFID chip is not critical), and the two electrodes. The V4050 chip is a 2-pin device that can be operated to transmit stored data by Q-switching. It contains an integrated 170 pF capacitor, so the receiver is resonant at 125 kHz, as well as suitable 10 rectification circuitry. The chip also contains an electronically erasable read-only memory of 1 kbit that can be programmed by the signal source, and performs Q-switching in accordance with the binary pattern stored in its memory. It is found that the inductor may be removed without catastrophic effects on the read range or the rate of data-transmission errors. In the present context, "read range" means the maximum distance by which the electrodes 122 and electrode 110 may be separated without compromising the ability to generate a detectable loading when the user physically touches one of the electrodes 122.

Figure 3:
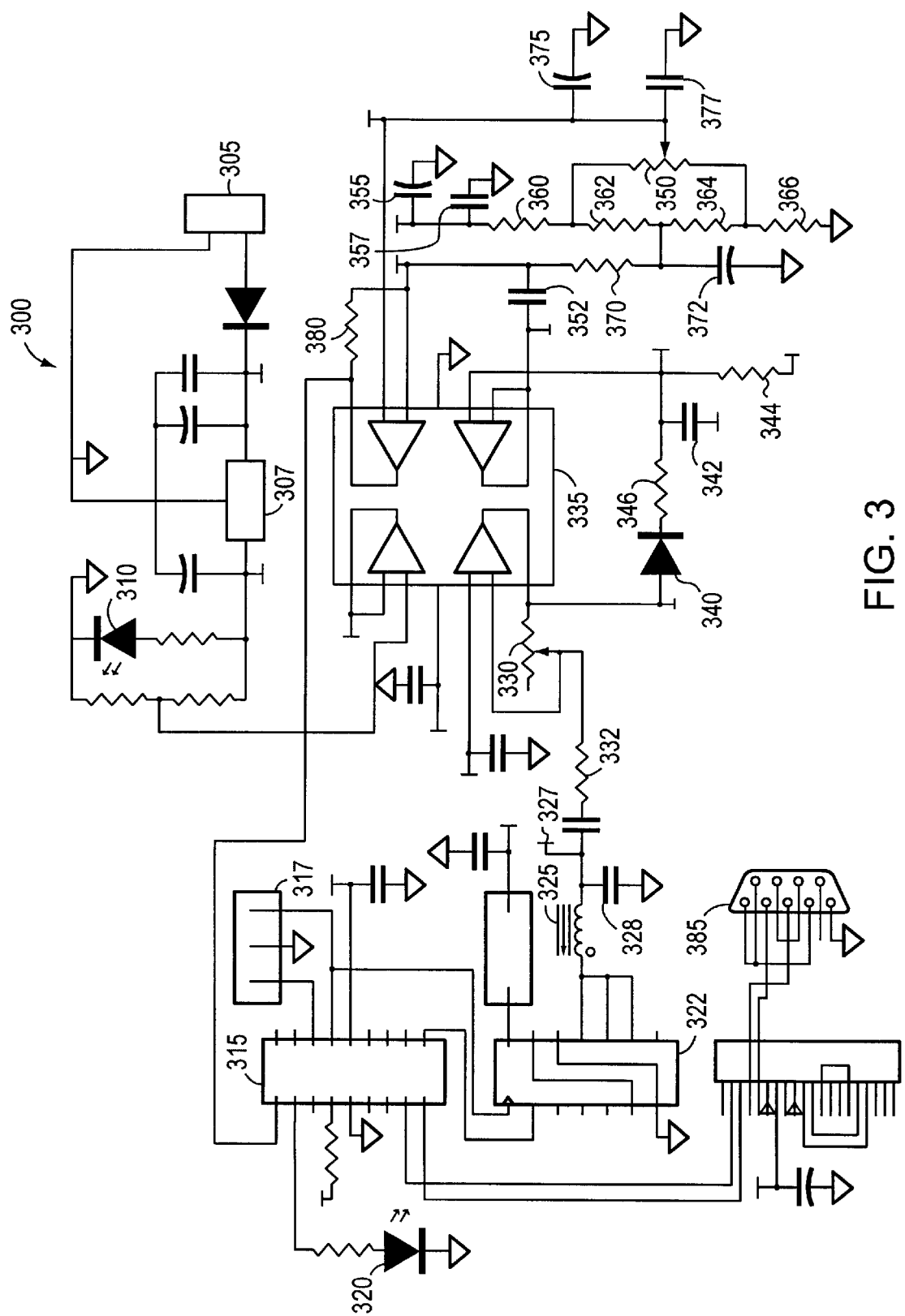
FIG. 3 is a schematic representation of a reader circuit capable of interacting with the receiver shown in FIG. 2.

A reader circuit, capable of generating the AC signal and detecting variations in loading, is shown in FIG. 3. The circuit 300 is powered by, for example, a 9-volt source capable of supplying at least 500 mA. This power source is connected by way of a jack 305 to a voltage regulator 307, which converts the input to 5 volts. The capacitors flanking voltage regulator 307 operate as bypass capacitors, shunting higher-frequency noise on the 5-volt power rail to ground. If 5 volts is being successfully supplied, then the red power LED 310 should light.

The PIC microcomputer 315, which may be a 16F84 8-bit microcontroller, represents a central element in the circuit and is connected to an 8 MHz external oscillator 317. As described below, PIC 315 is used to convert a sensed multi-bit signal from the receiver into a pulse train at digital-logic signal levels. If PIC 315 has been programmed successfully, and the power LED 310 indicates that the board has power, then an 8 MHz sinusoidal signal should be observed on pins 15 and 16 of PIC 315. A yellow debug LED 320 may be connected to physical pin 2 (called PIN_A3 in PIC code) of PIC 315. If PIC 315 has been successfully programmed with code that outputs a 'high' to PIN_A3, then the debug LED 320 should light. The 74HC383 dual 4-bit counter/divider 322 is connected so as to divide the 8 MHz clock, outputting a square-wave signal at 125 kHz at pin 10 (the divide by 64 output). The divide by 32, 64, and 128 outputs of counter-divider 322 are connected to a variable-inductor transmit coil 325. The square wave will-be deformed by the inductance of the transmit electrode 327. Transmit coil 325 is adjusted so that the resonance of the transmit oscillator formed by coil 325 and the 1000 pF capacitor 328 is tuned to 125 kHz. This will provide the maximum transmit voltage (about 75–80 volts peak-to-peak) on the transmit electrode 327.

If one electrode of a receiver configured as discussed above is placed within the read range and touched (or closely approached) by a user, the receiver will begin amplitude modulating the transmitted carrier in accordance with a stored bit pattern. With some care, this modulation can be observed as a 1–5 volt, 2 or 4 kHz square wave variation in the amplitude of the 80 volt, 125 kHz carrier at transmit electrode 327. The modulation can be adjusted by means of the 100 kΩ potentiometer 330, which controls a voltage divider formed by the potentiometer in combination with the resistor 332 and the quad operational amplifier 335. The potentiometer 330 should not be adjusted too often—preferably no more than 20–50 times through its full range. The voltage divider feeds into a demodulation block consisting of the diode 340, the 1000 pF capacitor 342, and the 1 MΩ resistor 344. A 1 kΩ resistor 346 provides some low pass filtering behavior for the peak detector. The demodulation block filters out the carrier frequency, so the signal consists primarily of the lower frequency modulations—i.e., the bit pattern—introduced by the receiver.

The demodulated signal should appear as a 100–500 mV square wave, centered at approximately 2.5 volts. To convert the signal to the 0- and 5-volt levels characteristic of digitial logic circuits, it is fed into a comparator circuit made up of pins 8, 9, and 10 of quad operational amplifier 335. If clean bits are still not observed at pin 1 of PIC 315, then it may be necessary to adjust the 10 kΩ potentiometer 350, which controls the threshold level on the comparator circuit.

The essential idea of the comparator circuit is to fix the DC offset of the raw demodulated output of the diode demodulation block at exactly 2.5 volts, by AC coupling it to a DC 2.5 volt source. Then the potentiometer 350 serves as a fine adjust for the threshold level of the comparator around 2.5 volts. The raw demodulated signal is AC-coupled by the 0.1 μF capacitor 352, which is itself coupled to 2.5 volts (rather than to ground). A clean and stable 2.5-volt reference for the AC coupling is provided by the bypass capacitors 355 (10 μF) and 357 (0.1 μF), and the voltage divider made up of the resistors 360 (1 kΩ) 362 (240 Ω), 364 (240 Ω), and 366 (1 kΩ). The resistor 370 (10 kΩ) and the capacitor 372 (10 μF) form a low-pass filter with a 3 dB cutoff at 10 Hz, so that only the average value of the raw demodulated signal is supplied to the 2.5 volt node between resistors 360, 362.

As stated above, potentiometer 350 provides a 10-turn fine adjust on this voltage divider and, hence, the 2.5-volt threshold for the comparator. This variable-threshold voltage is kept free of noise by a pair of bypass capacitors 375 (10 μF) and 377 (0.1 μF). The comparator circuit has a moderate amount of hysteresis for resilience to noise as set by the resistor 380 (1 MΩ).

As stated above, PIC 315 receives the clean digital signal from the comparator circuit at pin 1. The bits represented by the signal are then transferred by the PIC onto an RS-232 port 385 for capture by a computer or other external processor.

It will therefore be seen that the foregoing represents a readily implemented approach to touch sensing using inexpensive transmission and receiver circuitry. The terms and expressions employed herein are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. A method of wirelessly imparting information, the method comprising:
   a. providing a tag unit comprising an electrical load and a pair of electrodes spaced apart by a dielectric medium, the load bridging the electrodes;
   b. capacitively coupling a signal source to the electrodes without creating a detectable potential difference therebetween;
   c. selectively coupling one of the electrodes to ground, thereby creating a detectable potential difference across the electrodes and drawing current from the signal source through the load; and
   d. sensing the load and deriving information therefrom.

2. The method of claim 1 wherein a plurality of tag units, all capacitively coupled to the signal source and each having a different load, are provided, the information comprising identification of a tag touched by a user, the user's touch coupling the selected ground.

3. The method of claim 1 wherein the electrical load is a variable-impedance circuit powered by the potential difference and drawn current, powering of the circuit producing temporal variations in impedance corresponding to information and causing, in the signal source, corresponding variations in loading, the variations being sensed to derive the information.

4. The method of claim 3 wherein the variable-impedance circuit varies a Q-factor of the receiver.

5. The method of claim 3 wherein the variable-impedance circuit varies a resonant frequency of the receiver.

6. The method of claim 1 wherein the signal source is capacitively coupled to the electrodes by means of a transmitting electrode connected to the signal source and within a read range of the tag-unit electrodes.

7. The method of claim 6 wherein the transmitting electrode is part of an item of furniture.

8. The method of claim 6 wherein the transmitting electrode is embedded within an architectural surface or fixture.

9. The method of claim 6 wherein the transmitting electrode is embedded in a game board and the tag unit serves as a game token.

10. The method of claim 1 wherein the derived information causes an action to be taken by a computer.

11. The method of claim 10 wherein the action is selection of a web page.

12. The apparatus of claim 11 further comprising a transmitting electrode connected to the signal source and capacitively coupling the signal source to the electrodes within a read range of the tag-unit electrodes.

13. The apparatus of claim 12 wherein the transmitting electrode is part of an item of furniture.

14. The apparatus of claim 12 wherein the transmitting electrode is embedded within an architectural surface or fixture.

15. The apparatus of claim 12 wherein the transmitting electrode is embedded in a game board and the tag unit serves as a game token.

16. The apparatus of claim 10 further comprising means for causing the derived information to cause an action to be taken by a computer.

17. The apparatus of claim 16 wherein the action is selection of a web page.

18. Apparatus for wirelessly imparting information, the apparatus comprising:
   a. a tag unit comprising an electrical load and a pair of electrodes spaced apart by a dielectric medium, the load bridging the electrodes; and
   b. a signal source capacitively coupled to the electrodes without creating a detectable potential difference therebetween, the signal source being configured to detect the load and derive information therefrom when current is drawn therethrough as a result of selective coupling of one of the electrodes to ground, thereby creating a potential difference across the electrodes.

19. The apparatus of claim 18 wherein the electrical load is a variable-impedance circuit powered by the potential difference and drawn current, powering of the circuit producing temporal variations in impedance corresponding to information and causing, in the signal source, corresponding variations in loading, the variations being detected to derive the information.

20. The apparatus of claim 19 wherein the variable-impedance circuit varies a Q-factor of the receiver.

21. The apparatus of claim 19 wherein the variable-impedance circuit varies a resonant frequency of the receiver.

* * * * *